May 22, 1962 — T. W. MULLEN — 3,035,626
TUBELESS TIRE REPAIR EQUIPMENT
Filed Sept. 8, 1959
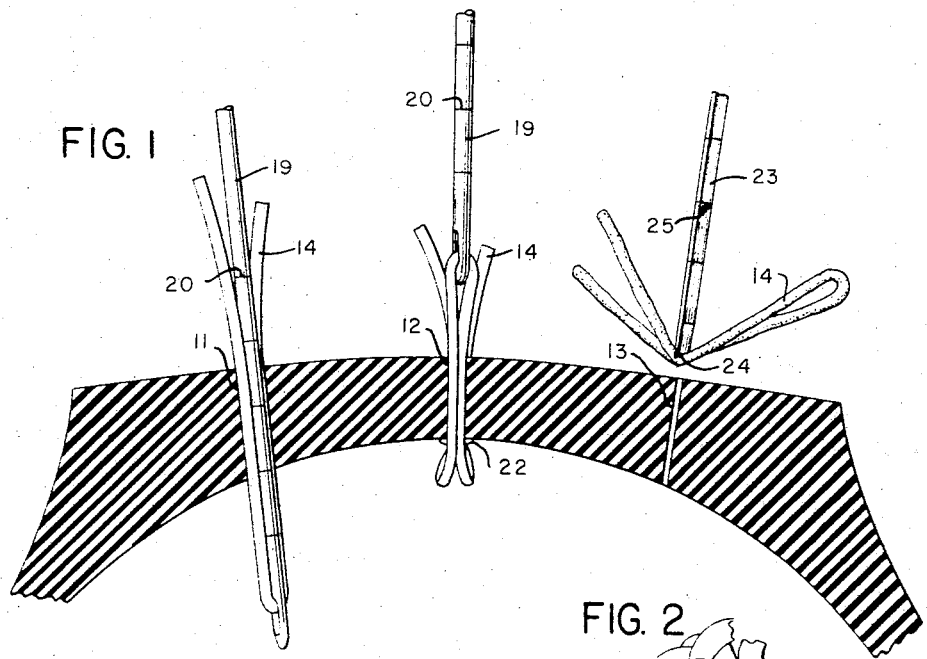
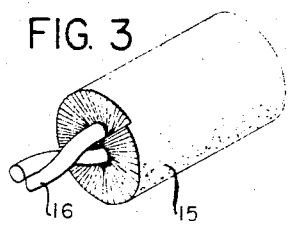
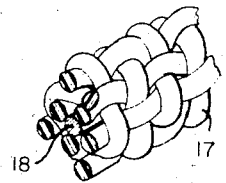
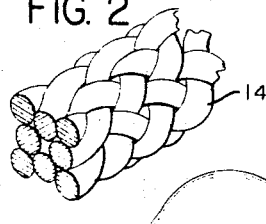
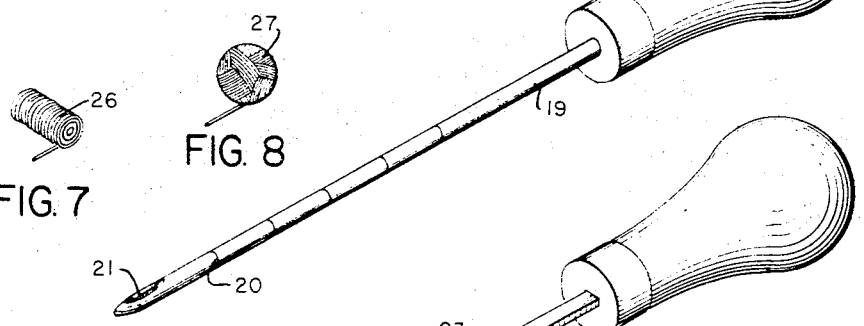
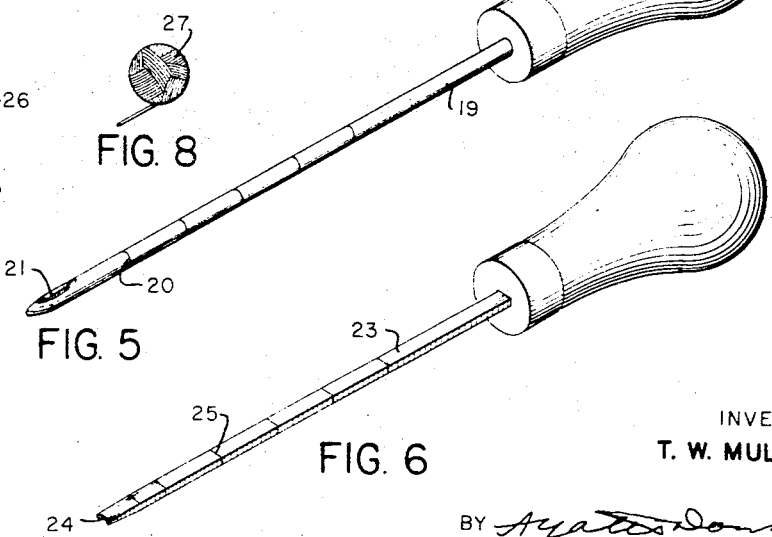
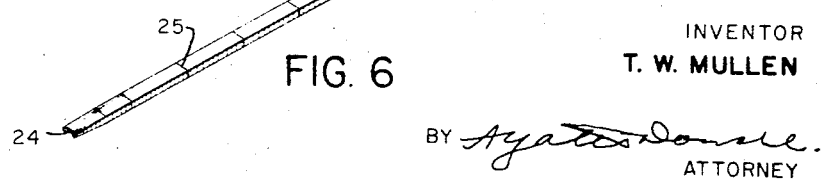
INVENTOR
T. W. MULLEN

United States Patent Office 3,035,626
Patented May 22, 1962

3,035,626
TUBELESS TIRE REPAIR EQUIPMENT
Thomas W. Mullen, 2013 W. Iowa St.,
Evansville, Ind.
Filed Sept. 8, 1959, Ser. No. 838,613
2 Claims. (Cl. 152—370)

This invention relates to the repair of puncture openings in pneumatic tires of the tubeless type and to the equipment employed and more particularly to a method of repairing such tires and the materials by which such repairs can be accomplished.

The invention relates especially to the repair of tubeless tires with a filler and a bonding agent or sealant applied within the puncture opening and which filler is formed of fibers and bonding agent or sealant of a character which when applied will seal the opening against the passage of air.

The invention is an improvement over that disclosed in Patent 2,803,284 of August 20, 1957 issued to applicant and which patent disclose a unit for the repair of a puncture in a tubeless tire or other pneumatic body without the necessity of demounting the same and with a minimum loss of air as well as insuring against leakage of air through such opening, the unit comprising a filler strand of fibrous material with a coating of flowable substance which under normal conditions when inserted in a puncture hole will serve to repair the same.

In the patented invention likelihood of leakage of air through the repaired puncture hole is increased when the tires are subjected to high pressure driven at high speeds and over hot roads and when the temperature is above normal due to the fact that the plastic sealant purposely produced and constituted to flow under the action of centrifugal force, sometimes will become thinner and an excess will be discharged by such centrifugal force allowing the escape of air. The sealing effect imparted by the present invention is intended to compensate for the increase in temperature and extreme centrifugal force by the manufacture of the strand in a manner to deter the flow of the sealant from between the surfaces of the strand and in the opening in which the strand is located by the location of the fibers of the strands transversely of the length and the stiffening or reinforcement of the strand either by the fibers or the manner in which they are combined or by an independent stiffening member.

In the application of the invention of the patent, a length of the filler strand with the sealant is inserted in the opening to be repaired by means of needle which upon being inserted and retracted leaves loops protruding within the tire, the sealant providing a mound around each of such loops which forms a constant supply of flowable plastic at all times in intimate contact with the wall of the opening so that the filler strand can be severed close to the tread on the exterior of the tire to complete the repair. Since the outside wall of the tire is exposed to air at atmospheric pressure, the exposed plastic material will come in contact with dry dust and atmospheric air and consequently will dry and harden to conform to the outside surface of the tire.

In the present invention as well as in the patent, the filler strand as compared to rubber bands or mere rubber is substantially non-stretchable or at least by contrast with the tire to be repaired is not stretchable sufficiently that it can be displaced endwise to such degree that it will not fill and be retained within the opening to be closed and sealed.

It is an object of the present invention to provide repair equipment or material for closing an opening produced by a nail or other penetrating object in a tire and which closure is in the form of a fibrous filler strand, the stretchability of which is limited or reduced by a longitudinal reinforcement the stretchability of which is related to that of the tire and which reinforcement likewise is of substantially less cross-sectional diameter than that of the filler strand and which lends itself to application by the mere forcible insertion in the hole in the tire to be repaired.

Another object of the invention is to provide a filler or filler strands of various kinds which can be applied in a roller upon itself either in a coil, sphere, or other configuration, and an applicator or tool by which it can be forced in one direction into the hole in a tire, and with indicia on the applicator or tool to determine the distance the same is inserted.

A further object of the invention is to provide equipment for repairing a tubeless tire or other body of similar resilient character in the form of a filler strand and an applicator therefor which filler strand is composed mainly of impregnated interlaced fibers of any desired character including asbestos or other material preferably of poor heat conducting quality, woven or twisted together and with a longitudinal reinforcement, reinforcing strand, or group of strand.

Other objects and advantages of the invention will be apparent from the following description taken in conjunction with the accompanying drawing wherein:

FIG. 1 is a section through a tire illustrating one use of the invention;

FIG. 2, a perspective of a filler strand in which the fibers are braided to provide mutual reinforcement;

FIG. 3, a perspective of a filler strand in which the fibers are secured by twisted dual strand reinforcement;

FIG. 4, a perspective of a filler strand of woven fiber and a central reinforcement;

FIG. 5, a perspective of an awl or applicator needle having an eye through which the filler strands are adapted to be inserted and applied and with spaced indicator markings;

FIG. 6, a perspective of a modified awl having a flattened shaft and an arcuate end portion which engages the filler strands;

FIG. 7, a perspective of a generally cylindrical roll of filler strand; and

FIG. 8, a perspective of a filler strand rolled upon itself to provide a ball or sphere.

Briefly stated the repair equipment of the present invention comprises filler strand material and an applicator therefor, such filler strand material being reinforced either by the mutual reinforcement of the fibers or by the addition of a longitudinal reinforcement. In each case the longitudinal stretchability of the filler strand is reduced to a degree that it is less than that of the tire to be repaired and of sufficient body that one or more loops can be inserted by an applicator tool to effect the repair and indicate the extent of insertion.

The term "fiber," as used herein, means a thread or threadlike element, and includes threads, filaments, staple, strands, cables, cords, and the like.

With continued reference to the drawing, a pneumatic tire 10 of the tubeless type is illustrated with puncture holes or openings 11, 12 and 13 which it is desired to close and seal against the escape of air within the tire and under pressure.

In order to provide equipment by which the openings may be closed, a filler piece and an applicator are provided. The filler piece 14 may be composed of a length of fibrous material such as interlaced or interwoven strands of fibers which provide mutual support for each other or if desired the filler piece 15 may be of fibers with multiple twisted longitudinal reinforcing members 16, such filler piece resembling a conventional pipe cleaner having sufficient bulk to fill the openings in which the filler piece is applied.

If preferred, a filler piece such as that disclosed in FIG. 4 may be employed having a reinforcing core 18 of one or more strands and with strands of fiber disposed about the central reinforcing core in any desired manner as for example by being woven thereabout.

With each of the filler strands the fibers or filaments are coated or impregnated with a bonding agent or sealant which may be although not limited to a mixture of rubber or rubber-like latex or other substance with pine rosin, petrolatum and a solvent of gasoline or other hydrocarbon. On account of the abundance of such sealant along the length of the filler strand, the introduction of the strand with the sealant thereon into an opening produced by a nail or other sharp instrument in a tire will readily fill the opening in the tire due to the nature of the filler strand and the sealant and will seal against the escape of air from the tire. The sealant is of a character to flow along the fiber strands when the latter is squeezed or gripped due to the elasticity of the tire.

In the filling of a puncture hole or other opening a generally awl type applicator 19 may be employed having measuring indicia 20 thereon and an eye 21 through which a filler strand may be inserted in order that said filler strand may be forced through an opening such as the opening 11 in FIG. 1 and then retracted such as to the position shown in the opening 12 in said figure so that there are four strands in the opening and the sealant or bonding agent has formed an annular seal 22 on the inside of the tire around the ends of the four filler strands, being deposited at such location upon the retraction of the applicator with the central portion of the filler strands and with the four filler strands and the sealant completely filling the hole or opening in the tire and preventing the escape of air therethrough.

Instead of applying the filler strand with an awl type applicator or needle with an eye, the filler strand may be applied in multiple as illustrated in FIG. 1 in the hole 13 by means of a generally screw driver type applicator 23 having a concave extremity 24 adapted to be applied against the multiple strands as illustrated in the upper right-hand corner of FIG. 1 of the drawing and forced into the opening 13, the amount of penetration being observable from the indicator lines 25. The applicator 23 may have flat sides to accommodate the filler strands along the same during the application. It will be apparent that less filler strand material will be required with the use of the applicator of FIG. 6.

The filler strands, regardless of composition, may be wound upon themselves as for example in an elongated body 26 or into a spherical body 27 as disclosed in FIGS. 7 and 8 respectively and regardless of whether the reinforcement is of wire or other material of sufficient stiffness to retain it in its coiled condition.

It will be apparent from the foregoing that tire repair equipment is provided including a filler strip having a soft fibrous exterior longitudinally reinforced so that it has a capacity for lateral integration and correspondence in cross-section conforming to the irregularities of the opening in which it is applied and with the impregnated fibers and the bonding agent or sealant durable and permanent repair can be effected.

The repair substance disclosed may be used to repair tubeless tires although not limited to such use and may be employed in repairing other devices having a flexible wall either reinforced or not and including footballs, basketballs, garden and other hose, bicycle tires and the like.

With the construction of the fibers as disclosed in FIGS. 2, 3 and 4 the sealant on the fibers will be retained against lengthwise flow along the filler due to the fact that the fibers extend transversely of the length of the filler strand and the sealant will not be forced lengthwise of the strand and be thrown from the strand by centrifugal force when it is located in a puncture hole but the cross fibers will block such movement of the sealant.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A unit for the repair of a relatively small opening in a flexible air retaining tire wall, said unit comprising a flexible elongated filler of multiple twisted longitudinal reinforcing members, fibers retained by said multiple twisted longitudinal reinforcing members and disposed sharply across said members, a viscous flowable air sealant incorporated in said filler and coating the exterior thereof, said filler having sufficient bulk to fill the opening in which it is located, whereby the fibers disposed sharply across said members block the flow of said sealant along said filler to the outside of said retaining wall but will allow reverse flow of the sealant around a portion of the filler which projects within the tire wall during the flexing thereof.

2. A unit for the repair of a relatively small opening in a flexible air containing tire wall, said unit comprising a flexible elongated interwoven reinforcement piece of a character to stretch less than the air retaining wall of a tire to be repaired, said piece having longitudinal strands interwoven with transverse strands, said transverse strands being disposed sharply across said longitudinal strands, and a viscous flowable air sealant impregnated in said reinforcement piece coating the exterior thereof, said unit being of a construction to conform to the configuration of an opening in which it is located, whereby said transverse strands will block the flow of sealant along said filler to the outside of the retaining wall but will allow reverse flow of the sealant around the portion of the reinforcement piece which projects within a retaining tire wall during the flexing thereof.

References Cited in the file of this patent

UNITED STATES PATENTS 2,803,284    Mullen ---------------- Aug. 20, 1957